Patented Jan. 30, 1945

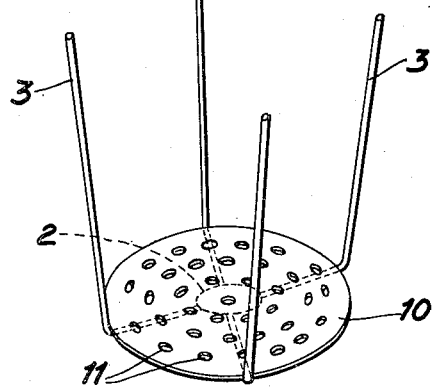
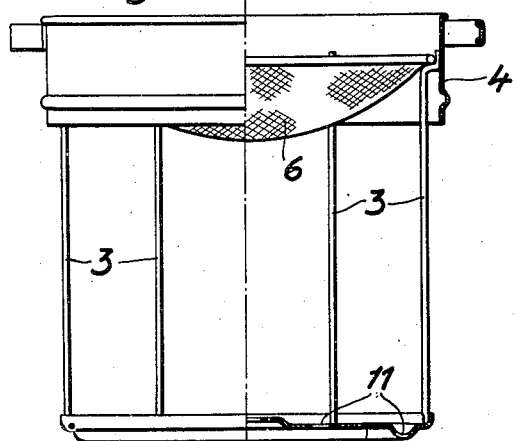
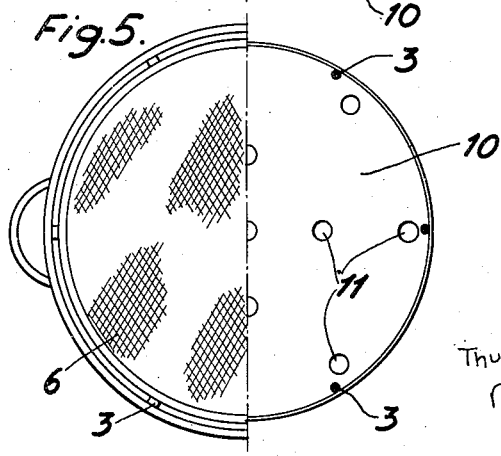

2,368,141

UNITED STATES PATENT OFFICE 2,368,141

DEVICE FOR OBTAINING JUICE BY MEANS OF STEAM

Thure Anton Johnsson, Stockholm, Sweden, assignor to Kooperativa Förbundet Förening U. P. A., Stockholm, Sweden Application July 1, 1943, Serial No. 493,141
In Sweden May 28, 1942

9 Claims. (Cl. 99—239)

The present invention relates to a device for obtaining juice by means of steam which consists of a frame intended to be placed in a common preserving apparatus, which frame is adapted to carry a juice pot and is provided with means for carrying a juice filter. The purpose of said device is that water is brought to the boil in the preserving apparatus so that steam is formed which is allowed to act upon berries or fruit on the filter so that they are freed from the juice which flows down into the pot. However, such known devices are connected with a great many drawbacks. For example, they are difficult to manipulate when the device is to be removed from the preserving apparatus, or when the obtained juice is to be poured off. Moreover, in some cases they have not allowed the steam to sufficiently act upon the berries or the fruit. They have also been bulky in view of transport and storing.

The device according to the invention eliminates all of the abovementioned drawbacks. It it substantially characterized by the fact that it consists of a ring with projections adapted to rest against the edge of the preserving apparatus, and an inward-extending flange for carrying a ring retaining the juice filter in its place, bands for supporting the juice pot extending downwards from said flange and being bent some distance from the bottom of the preserving apparatus, said supporting bands being connected with one another by some suitable device on which the juice pot can be placed.

The lower portions of the supporting bands may be connected with a ring or with a bottom provided with at least one central opening because in such a case the frame may be kept in the preserving apparatus together with the common inset. This is not possible if the supporting bands are allowed to form a cross instead of a ring or bottom. The supporting bands may preferably some distance from the bottom be surrounded by one or more further bands to protect small juice pots. Further, the supporting bands may extend obliquely inwards so that the whole frame becomes slightly conical, in order to make it possible to place several frames one within the other at storing or transport of a large number of frames. For the purpose of facilitating the manipulation of the device the annular member is on the outside provided with two diametrically opposed handles. Further, the above mentioned member should be shaped in such a way that it can receive the cover of the preserving apparatus and the lower edge of the member can have an inward-turned flange or a number of projections or shoulders for carrying a ring serving to retain the juice filter.

Figure 1:
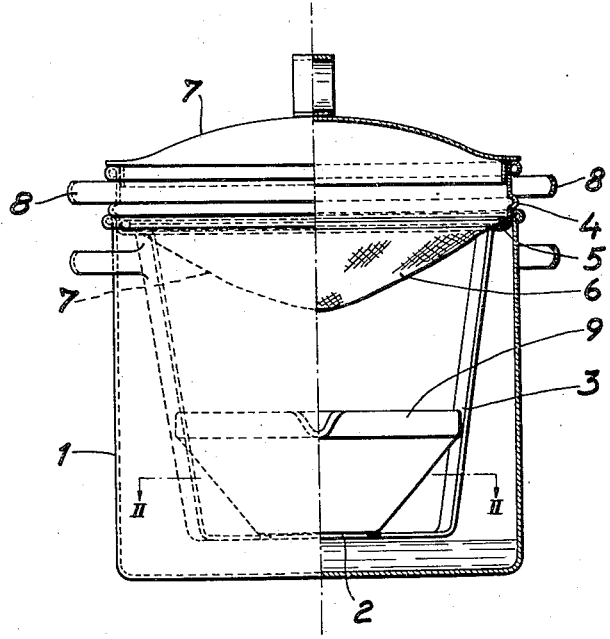
Figure 2:
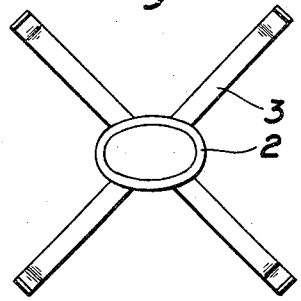

Three embodiments of the invention are illustrated on the accompanying drawings, in which Fig. 1 shows a device according to the invention viewed from the side and in vertical section. Fig. 2 is a section on line II—II of Fig. 1. Fig. 3 is the lower part of the supporting frame according to the second embodiment viewed in perspective. Fig. 4 shows the device according to the third embodiment viewed from the side and in vertical section. Fig. 5 shows the frame according to Fig. 4 viewed in plan and in horizontal section.

The common preserving apparatus is indicated by 1, in which, as already mentioned, a frame may be placed which in the embodiment according to Figs. 1 and 2 has a ring 2 which, when the device is fitted in its place, is located at some distance from the bottom of the preserving apparatus. Supporting bands 3 sloping inwards extend upwards from said ring. At the top the bands are connected with an annular member 4 shaped in such a way that it can be inserted in, and carried by the upper edge portion of the preserving apparatus. The ring 4 has preferably an inward-extending flange 5 for carrying a ring retaining the juice filter 6 in which the fruit to be unjuiced is placed. A juice pot 9 of suitable height is placed on the ring 2. At the top the ring 4 is shaped in such a way that it can receive the cover 7 of the apparatus 1, and is provided with handles or ears 8.

The apparatus is filled with water about up to the juice pot whereafter the water is caused to be brought to the boil and form steam. The steam then acts upon the fruit or berries in the filter which are easily unjuiced, the juice flowing through the filter into the pot. When all the juice has been obtained, the annular member 4 is lifted by the ears 8 without the steam burning the hands. If the juice pot is provided with a lip, the juice can now be poured off into other suitable vessels without it being necessary to touch the hot juice pot.

When the preserving apparatus is to be used for preservation the frame is taken out and the usual inset is inserted. When the apparatus is not to be used the frame can be placed in the container 1 irrespective of the usual inset being located in the same if the lower portion of the frame is annular. Naturally, the frame can be provided with a vessel welded or riveted on thereto for the collection of the juice, but in such a case the device cannot be kept together with the usual inset, and therefore this device is not so suitable as the one just described.

In the embodiment according to Fig. 3 the supporting bands 3, which preferably consist of rods with round cross section, are at the bottom connected with one another for example through a plate having a circular aperture or through a ring 2. Said plate or ring together with the supporting rods carry a bottom 10 which either may lie loose on, or be fixed to the frame by soldering or welding. As will be seen in Figs. 4 and 5, the rods may in the latter case preferably be fixed direct at the outer edges of the bottom 10. For reason stated above there should preferably be a circular hole in the bottom 10 but for the passage of the steam the bottom may moreover be provided with a number of slots or apertures 11 all over the surface.

By using the bottom 10 this apparatus may also serve as a preserving apparatus, the preserving glasses being supported by the bottom and the clamping means, if any, by the rods 3. Thus, the inset necessary for preservation here becomes superfluous. As a matter of fact, such supporting frames cannot be placed in one another at storing and transport, but this does not matter so much since the advantage is obtained that the usual inset member for preservation may be completely omitted. The rods 3, which at the top are fixed to the inside of the member 4, are preferably bent inwards whereby the necessary space for the end portions of the clamping means, said end portions being adapted to be connected with the rods, as well as for shoulders serving to carry the ring connected with the juice filter 6 is obtained.

Having now described my invention, what I claim as new and desire to secure by Letters Patent is:

1. Apparatus for obtaining juice by means of steam, consisting of a frame adapted to be placed in a common preserving apparatus and to carry a juice pot, said frame being at the top provided with means for carrying a juice filter, said means consisting of a ring with projections adapted to rest against the edge of the preserving apparatus, and an inward-extending flange for carrying a ring retaining the juice filter in its place, bands for supporting the juice pot extending downwards from said flange and being bent some distance from the bottom of the preserving apparatus, said supporting bands being connected with one another by some suitable device on which the juice pot can be placed.

2. Apparatus as claimed in claim 1, the lower bent edges of the supporting bands being connected with one another by means of a ring on which the juice pot can be placed.

3. Apparatus as claimed in claim 1, the supporting bands extending obliquely inwards and downwards so that the frame obtains a conical shape in order to make it possible to place several frames one within the other.

4. Apparatus as claimed in claim 1, the supporting bands being some distance from the bottom surrounded by at least one further band to protect small juice pots.

5. Apparatus as claimed in claim 1, the annular member being on its outside provided with two diametrically opposed handles.

6. Apparatus as claimed in claim 1, the annular member being shaped in such a way that it can receive the cover of the preserving apparatus, the lower edge of said member being provided with an inward-turned flange for carrying a ring serving to retain the juice filter.

7. Apparatus as claimed in claim 1, the frame for carrying the juice pot being at the bottom provided with a plate for carrying preserving glasses in order that the apparatus may serve as a preserving apparatus.

8. Apparatus as claimed in claim 1, in which the frame for carrying the juice pot includes at its bottom a plate for carrying preserving glasses, said plate having at least one aperture provided in the centre of the plate.

9. Apparatus as claimed in claim 1, in which the frame for carrying the juice pot includes at its bottom a plate for carrying preserving glasses, said plate being detachably mounted on the frame.

THURE ANTON JOHNSSON.